United States Patent
Masuda (10) Patent No.: US 10,530,981 B2
(45) Date of Patent: Jan. 7, 2020

(54) IMAGE CAPTURING APPARATUS, CONTROL METHOD, AND STORAGE MEDIUM FOR NOT PRODUCING A NOTIFICATION SOUND

(71) Applicant: CANON KABUSHIKI KAISHA, Tokyo (JP)

(72) Inventor: Yuta Masuda, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 16 days.

(21) Appl. No.: 16/012,580

(22) Filed: Jun. 19, 2018

(65) Prior Publication Data
US 2019/0014252 A1  Jan. 10, 2019

(30) Foreign Application Priority Data
Jul. 6, 2017 (JP) ................. 2017-132938

(51) Int. Cl.
 H04N 5/232 (2006.01)
(52) U.S. Cl.
 CPC ............. H04N 5/23203 (2013.01)
(58) Field of Classification Search
 CPC .................................. H04N 5/23203
 See application file for complete search history.

(56) References Cited

U.S. PATENT DOCUMENTS

| 5,844,606 A * | 12/1998 | Suemoto ............. G11B 31/006 348/375 |
| 2013/0047189 A1* | 2/2013 | Raveendran .......... H04N 21/23 725/81 |

FOREIGN PATENT DOCUMENTS

| JP | 2009-044567 A | 2/2009 |
| JP | 2014-229930 A | 12/2014 |

\* cited by examiner

*Primary Examiner* — Nicholas G Giles
(74) *Attorney, Agent, or Firm* — Canon USA, Inc., IP Division

(57) ABSTRACT

An image capturing apparatus includes an image capturing unit, a sound input unit configured to input sound, a sound production unit configured produce notification sound, a connection unit configured to connect to an external device, an output unit configured to output the sound input from the sound input unit and a live view image captured by the image capturing unit to the external device via the connection unit, and a control unit configured to control the sound production unit so as not to produce the notification sound when the sound and the live view image are output by the output unit.

15 Claims, 7 Drawing Sheets

IMAGE CAPTURING APPARATUS, CONTROL METHOD, AND STORAGE MEDIUM FOR NOT PRODUCING A NOTIFICATION SOUND

BACKGROUND

Field of the Disclosure

The present disclosure generally relates to an image capturing apparatus that captures an image of a subject, a control method of the image capturing apparatus, and a storage medium.

Description of the Related Art

In the case of capturing and recording images by an image capturing apparatus, the images are sometimes recorded on a recording medium provided in the image capturing apparatus or are sometimes recorded on a recording medium provided in an external recorder which is an external device.

In recent years, Japanese Patent Application Laid-Open No. 2014-229930 discusses a technique of outputting an image or the like captured by an image capturing apparatus to an external monitor by using a high-definition multimedia interface (HDMI®) output or the like and recording the output data using an external recorder, as a method for recording data on an external recorder. In addition, Japanese Patent Application Laid-Open No. 2009-44567 also discusses a technique of outputting audio data obtained by collecting sound with a microphone mounted on an image capturing apparatus to an external speaker connected to a television set or the like.

In the related art techniques described above, however, when considering that a live view image obtained by performing live view image capturing by the image capturing apparatus and audio data related to the live view image are output to an external device as output data, the following issue arises: notification sound output according to an operation on the image capturing apparatus is mixed in the audio data. This makes it difficult for the external device to acquire appropriate output data depending on the image capturing status of the image capturing apparatus.

SUMMARY

The present disclosure provides improvements in image capturing technology in view of the above-described issues, and relates to a mechanism that enables an external device to acquire appropriate output data when data obtained by an image capturing apparatus is output to the external device.

According to one or more aspects of the present disclosure, an image capturing apparatus includes an image capturing unit, a sound input unit configured to input sound, a sound production unit configured to produce notification sound, a connection unit configured to connect to an external device, an output unit configured to output the sound input from the sound input unit and a live view image captured by the image capturing unit to the external device via the connection unit, and a memory and at least one processor which function as a control unit configured to control the sound production unit so as not to produce the notification sound when the sound and the live view image are output by the output unit.

Further features of the present disclosure will become apparent from the following description of exemplary embodiments with reference to the attached drawings.

DESCRIPTION OF THE EMBODIMENTS

Exemplary embodiments, features, and aspects of the present disclosure will be described in detail below with reference to the accompanying drawings.

It is to be noted that the following exemplary embodiments are merely examples for implementing the present disclosure and can be appropriately modified or changed depending on individual constructions and various conditions of apparatuses to which the present disclosure is applied. Thus, the present disclosure is in no way limited to the following exemplary embodiments.

Figure 1A:
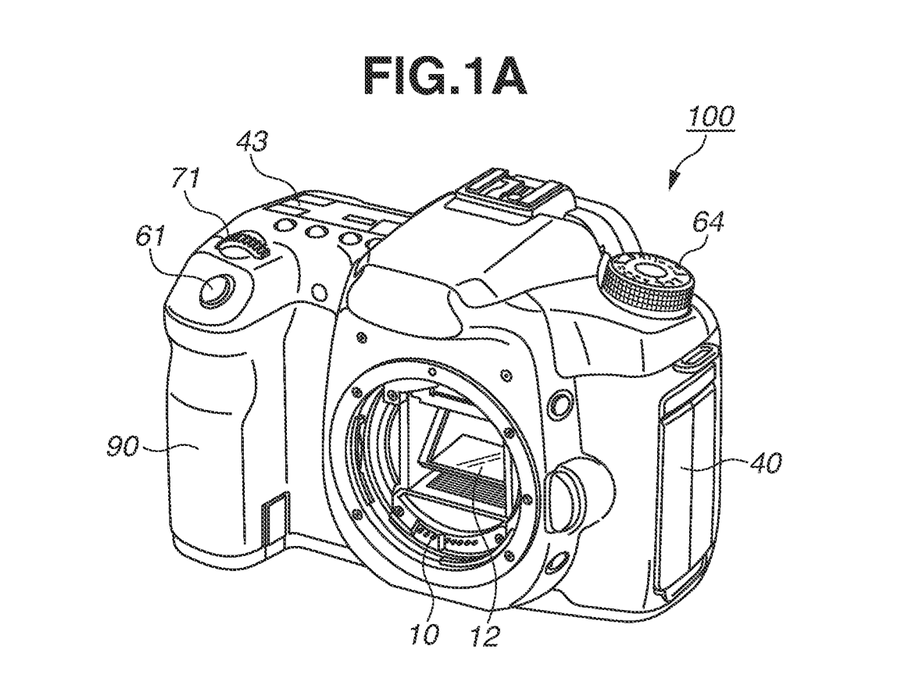
FIGS. 1A and 1B are diagrams each illustrating the appearance of a digital camera according to an exemplary embodiment of the present invention.
Figure 1B:
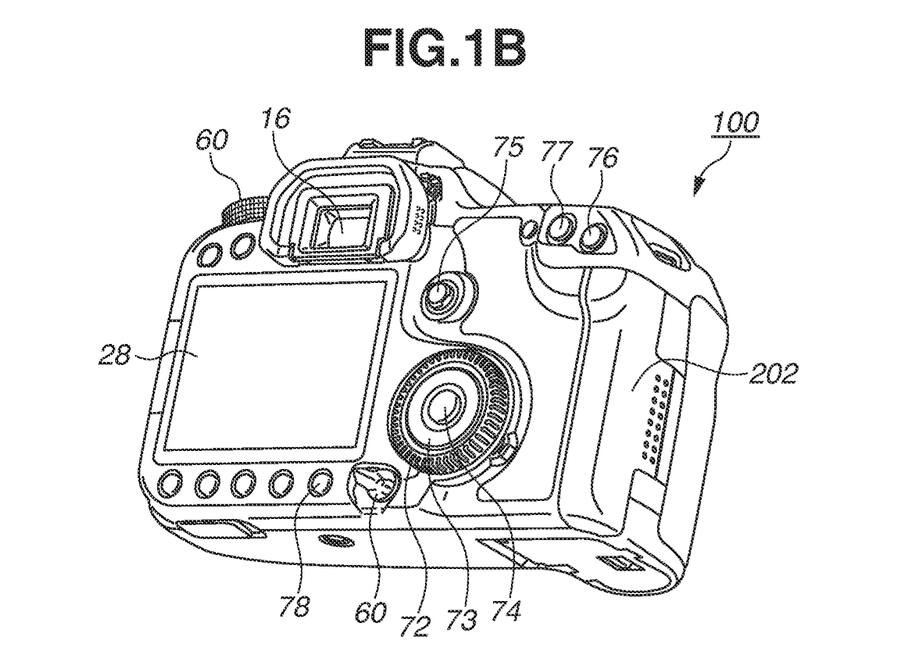

FIGS. 1A and 1B are diagrams each illustrating the appearance of a digital camera (image capturing apparatus) 100 according to an exemplary embodiment of the present disclosure. Specifically, FIG. 1A is a perspective view illustrating an example of the front surface of the digital camera 100, and FIG. 1B is a perspective view illustrating an example of the back surface of the digital camera 100.

A display unit 28 illustrated in FIG. 1B is a display unit that displays various images and various information and is provided on the rear surface of the digital camera 100. A finder external liquid crystal display unit 43 illustrated in FIG. 1A is a display unit that is provided on the upper surface of the digital camera 100 and displays various setting values for the digital camera 100, such as a shutter speed and an aperture.

A power switch 60 illustrated in FIG. 1B is an operation member that switches ON/OFF the power supply of the digital camera 100. A shutter button 61 illustrated in FIG. 1A is an operation member for instructing image capturing. A mode selection switch 64 illustrated in FIGS. 1A and 1B is an operation member for switching various modes. A terminal cover 40 illustrated in FIG. 1A is a cover for protecting a connector (e.g., an external interface (I/F) 57 illustrated in FIG. 2) of a connection cable or the like used to connect to an external device. A grip portion 90 illustrated in FIG. 1A is a holding portion that allows a user to easily grip with his/her right hand when the user holds the digital camera 100.

A main electronic dial 71 illustrated in FIG. 1A is a rotary operation member. Rotating the main electronic dial 71 allows a user, for example, to change the setting values such as the shutter speed and the aperture. A sub-electronic dial 72 illustrated in FIG. 1B is a rotary operation member allowing the user, for example, to move a selection frame and feeding images. A directional pad 73 illustrated in FIG. 1B is a directional pad (four-direction key) including up, down, left, and right portions which can be pressed. An operation corresponding to a pressed portion of the directional pad 73 can be performed. A SET button 74 illustrated in FIG. 1B is a push button that is mainly used to, for example, enter a selected item. A live view (LV) button 75 illustrated in FIG. 1B is an operation member for switching ON/OFF a live view mode in a menu button. The LV button 75 is used to start or stop moving image capturing (recording) in a moving image capturing mode. A zoom button 76 illustrated in FIG. 1B is an operation member for switching ON/OFF a zoom mode in a live view display of an image capturing mode and changing a magnification rate in the zoom mode. In a playback mode, the zoom button 76 functions as an operation member for zooming a playback image and increasing the magnification rate. A reduction button 77 illustrated in FIG. 1B is an operation member for reducing the magnification rate of the zoomed playback image and reducing the size of the displayed image. A playback button 78 illustrated in FIG. 1B is an operation member for switching between the image capturing mode and the playback mode. Pressing the playback button 78 in the image capturing mode makes it possible to shift the operation mode to the playback mode to cause a latest image among the images recorded on a recording medium (a recording medium 200 illustrated in FIG. 2) to be displayed on the display unit 28.

Figure 2:
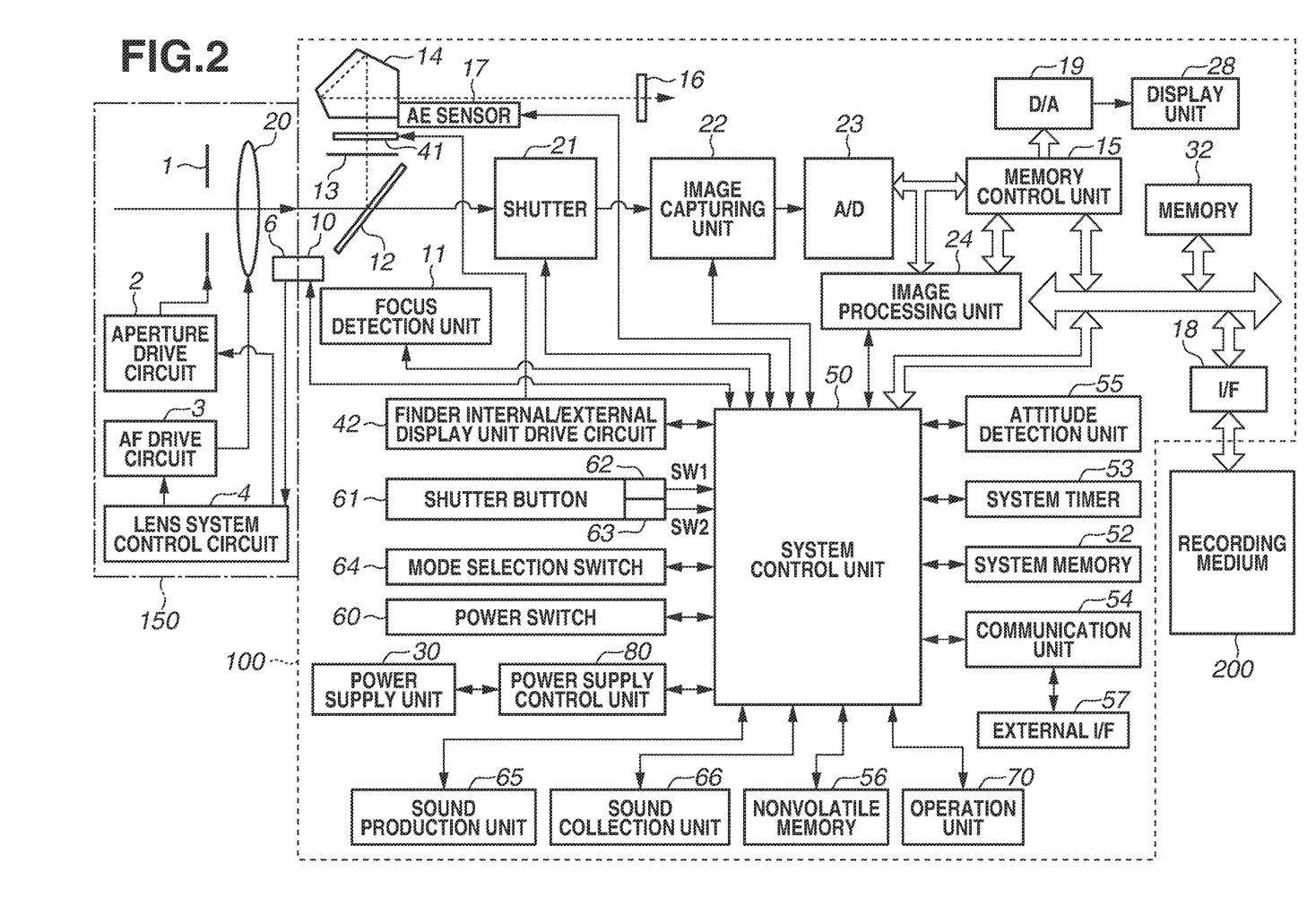
FIG. 2 is a schematic block diagram illustrating the digital camera according to the present exemplary embodiment.

A quick-return mirror 12 illustrated in FIG. 1A is moved up and down by an actuator (not illustrated) according to an instruction from a system control unit (a system control unit 50 illustrated in FIG. 2). A communication terminal 10 illustrated in FIG. 1A is a communication terminal used for the digital camera 100 to communicate with a lens (detachable). An eyepiece finder 16 illustrated in FIG. 1B is a look-in finder used to check the focus and composition of an optical image of a subject obtained through a lens unit (a lens unit 150 illustrated in FIG. 2) by observing a focusing screen (a focusing screen 13 illustrated in FIG. 2). A lid 202 is the lid of a slot accommodating the storage medium (the recording medium 200 illustrated in FIG. 2).

FIG. 2 is a diagram illustrating an example of a schematic configuration of the digital camera (image capturing apparatus) 100 according to an exemplary embodiment of the present disclosure. In FIG. 2, components similar to those illustrated in FIGS. 1A and 1B are denoted by the same reference numerals.

Referring to FIG. 2, the lens unit 150 is a lens unit on which a replaceable image capturing lens is mounted. A lens 20 of the lens unit 150 is generally composed of a plurality of lenses. In this case, however, for the sake of simplicity, FIG. 2 illustrates only one lens as the lens 20. A communication terminal 6 of the lens unit 150 is a communication terminal used to communicate with the digital camera 100. The communication terminal 10 is a communication terminal used for the digital camera 100 to communicate with the lens unit 150. The lens unit 150 communicates with the system control unit 50 via the communication terminals 6 and 10, and a lens system control circuit 4 which is provided in the lens unit 150 controls an aperture 1 through an aperture drive circuit 2, to thereby displace the position of the lens 20 for focusing through an autofocus (AF) drive circuit 3.

An AE sensor 17 measures the brightness of a subject through the lens unit 150. A focus detection unit 11 outputs defocus amount information to the system control unit 50. The system control unit 50 controls the lens unit 150 based on the defocus amount information to perform phase difference AF.

The quick-return mirror 12 is moved up and down by the actuator (not illustrated) according to an instruction from the system control unit 50 during exposure, live view image capturing, and moving image capturing. The quick-return mirror 12 is a mirror for switching an incident light beam from the lens 20 between the eyepiece finder 16 and an image capturing unit 22. The quick-return mirror 12 is normally placed to guide a light beam to the eyepiece finder 16. In the case of image capturing or live view display, the quick-return mirror 12 flips up and retreats from the light beam (mirror up) to guide the light beam to the image capturing unit 22. A central portion of the quick-return mirror 12 is a half mirror to transmit a part of a light beam. The quick-return mirror 12 transmits a part of a light beam to cause it to enter the focus detection unit 11 for focus detection.

The user can check the focus and composition of an optical image of a subject obtained through the lens unit 150 by observing the focusing screen 13 through a pentaprism 14 and the eyepiece finder 16.

A shutter 21 is a focal-plane shutter which can freely control the exposure time of the image capturing unit 22 under the control of the system control unit 50. The image capturing unit 22 is an image sensor that captures an image of a subject and is composed of a charge-coupled device (CCD), a complementary metal-oxide semiconductor (CMOS) device, or the like which converts an optical image of a subject into an image capturing signal (electrical signal). An analog-to-digital (A/D) converter 23 converts an analog image capturing signal into a digital image capturing signal and outputs the digital image capturing signal as image data on the subject. The image data output from the A/D converter 23 is directly written into a memory 32 through an image processing unit 24 and a memory control unit 15, or through only the memory control unit 15.

The image processing unit 24 performs image processing, such as resizing processing including predetermined pixel interpolation or reduction and color conversion processing on image data from the A/D converter or image data from the memory control unit 15. In addition, the image processing unit 24 performs predetermined arithmetic processing using image data obtained by image capturing. The system control unit 50 performs exposure control and ranging control processing based on the arithmetic processing result. In the processing, the system control unit 50 performs Through The Lens (TTL) autofocus (AF) processing, automatic exposure (AE) processing, and electronic flash pre-emission (EF) processing. Further, the image processing unit 24 performs predetermined arithmetic processing using image data obtained by image capturing, and also performs TTL automatic white balance (AWB) processing based on the obtained arithmetic processing result.

The memory 32 stores the image data obtained by converting the data obtained by the image capturing unit 22 into digital data using the A/D converter 23 and image data to be displayed on the display unit 28. The memory 32 has a storage capacity large enough to store data on a predetermined number of still images and moving image data and audio data with a length corresponding to a predetermined time. The memory 32 also functions as a memory (video memory) for image display. A digital-to-analog (D/A) converter 19 converts data for image display stored in the memory 32 into an analog signal and supplies the analog signal to the display unit 28. The image data for display written in the memory 32 in this manner is displayed by the display unit 28 via the D/A converter 19. The display unit 28 displays an image corresponding to the analog signal from the D/A converter 19 on a display device, such as a liquid crystal display (LCD). The D/A converter 19 converts the digital signals which have undergone A/D conversion by the A/D converter 23 once and stored in the memory 32 into analog signals, and sequentially transfers the analog signals to the display unit 28 to display images, thereby enabling the digital camera 100 to function as an electronic viewfinder and perform live view display (through image display).

A finder internal liquid crystal display unit 41 displays a frame (AF frame) indicating a ranging point at which autofocus is currently performed, icons indicating the setting state of the digital camera 100, and the like via a finder internal/external display unit drive circuit 42. The finder external liquid crystal display unit 43 illustrated in FIG. 1A displays various setting values for the digital camera 100, such as the shutter speed and the aperture, via the finder internal/external display unit drive circuit 42.

A nonvolatile memory 56 is a memory capable of electrically erasing and recoding data. For example, an electrically erasable programmable read-only memory (EEPROM) or the like is used as the nonvolatile memory 56. The nonvolatile memory 56 stores constants, programs, and the like for the operation of the system control unit 50. The programs stored in nonvolatile memory 56 are programs for implementing processing in flowcharts illustrated in FIGS. 4 to 6 to be described below by causing the system control unit 50 to execute the programs.

The system control unit 50 is a control unit, may include at least one processor and at least one memory, and may control the overall performance of the digital camera 100. As described above, the system control unit 50 may execute the programs stored in the nonvolatile memory 56, thereby implementing the processing in the flowcharts illustrated in FIGS. 4 to 6 to be described below. The system control unit 50 may perform display control by controlling the memory 32, the D/A converter 19, the display unit 28, and the like.

For example, a random access memory (RAM) may be used as a system memory 52. Constants, variables, programs read out from the nonvolatile memory 56, and the like for the operation of the system control unit 50 may be loaded in the system memory 52. A system timer 53 is a time measurement unit for measuring the times used for various types of control and the time of a built-in timepiece.

Referring to FIG. 2, the power switch 60, a first shutter switch 62 and a second shutter switch 63 which are provided in the shutter button 61, the mode selection switch 64, and an operation unit 70 are operation members for inputting various operation instructions to the system control unit 50.

The mode selection switch 64 switches, for example, the operation mode of the system control unit 50 to one of a still image recording mode, the moving image capturing mode, the playback mode, and the like. Examples of modes included in the still image recording mode include an automatic image capturing mode, an automatic scene discrimination mode, a manual mode, an aperture-priority mode (Av mode), and a shutter-speed prioritized mode (Tv mode). The still image recording mode also includes various types of scene modes with image capturing settings for each captured scene, a program AE mode, and a custom mode. In the present exemplary embodiment, a configuration in which one of these modes is selected by directly switching the mode selection switch 64, or a configuration in which a display is temporarily switched to a screen indicating a list of image capturing modes by the mode selection switch 64 and then one of the plurality of displayed modes is selected using another operation member can be applied. Similarly, the moving image capturing mode can include a plurality of modes.

The first shutter switch 62 is turned on to generate a first shutter switch signal SW1 when the user operates halfway the shutter button 61 provided on the digital camera 100, that is, performs so-called half-pressing operation (image capturing preparation instruction). The system control unit 50 starts operations, such as autofocus (AF) processing, automatic exposure (AE) processing, automatic white balance (AWB) processing, and electronic flash pre-emission (EF) processing in response to the input of the first shutter switch signal SW1.

The second shutter switch 63 is turned on to generate a second shutter switch signal SW2 when the user completes the operation of the shutter button 61, that is, performs so-called full-pressing (image capturing instruction). The system control unit 50 starts a series of image capturing processing operations from reading of a signal from the image capturing unit 22 to writing of image data into the recording medium 200 in response to the input of the second shutter switch signal SW.

The operation unit 70 includes various types of operation members to accept operations from the user. The operation unit 70 includes the main electronic dial 71, the sub-electronic dial 72, the directional pad 73, the SET button 74, the LV button 75, the zoom button 76, the reduction button 77, and the playback button 78 which are illustrated in FIGS. 1A and 1B. For example, an operation of selecting various types of function icons displayed on the display unit 28 allows the operation unit 70 to allocate functions to the selected icons, as needed, for each scene and make the selected icons also serve as various types of function buttons. Examples of the function buttons include an end button, a return button, an image feed button, a jump button, a narrowing-down button, and an attribute change button. For example, when the menu button is pressed, a menu screen which allows the user to make various settings is displayed on the display unit 28. The user can intuitively make various settings by using the menu screen displayed on the display unit 28 and the directional pad 73, which is a four-direction key including up, down, right, and left portions, and the SET button 74.

A power supply control unit 80 may be composed of a battery detection circuit, a DC-DC converter, a switch circuit for switching blocks to be energized, or the like. The power supply control unit 80 may detect the attachment/detachment of a battery, the type of a battery, and a battery remaining capacity in a power supply unit 30. In addition, the power supply control unit 80 may control the DC-DC converter and may supply voltages to the respective units including the recording medium 200 for a period of time based on the detection results and instructions from the system control unit 50. The power supply unit 30 may be composed of a primary battery such as an alkaline battery or a lithium battery, a secondary battery such as a NiCd battery, a NiMH battery, or a Li battery, an AC adapter, or the like.

A recording medium I/F 18 is an interface with the recording medium 200 such as a memory card or a hard disk. The recording medium 200 is a recording medium such as a memory card for recording image data obtained by image capturing (including, as needed, audio data obtained in this case), and is composed of a semiconductor memory, a magnetic disk, or the like. The recording medium 200 is attached to the digital camera 100, thereby enabling recording/reading of data with respect to the recording medium 200 through the recording medium I/F 18.

An attitude detection unit 55 detects the attitude of the digital camera 100 in the direction of gravitational force. An acceleration sensor, a gyroscope sensor, or the like can be used as the attitude detection unit 55. The system control unit 50 can determine, based on the attitude detected by the attitude detection unit 55, whether an image captured by the image capturing unit 22 is an image captured by the digital camera 100 which is in a horizontal or a vertical position. The system control unit 50 is capable of adding orientation information corresponding to the attitude detected by the attitude detection unit 55 to the image data (image file) obtained by the image capturing unit 22, and is also capable of recording images by rotating the images.

A communication unit 54 is a connection unit that is connected to the external device wirelessly or by priority connection using a wired cable, and transmits and receives image data, audio data, and the like to and from the external device. The communication unit 54 is configured to be connectable to a wireless local area network (LAN) and the Internet for communication. In addition, the communication unit 54 can transmit image data (including live view image data) obtained by the image capturing unit 22 and image data recorded on the recording medium 200 and receive image data and other various information from the external device.

The external I/F 57 is a connection terminal used to connect to the external device with a wired cable. For example, the external I/F 57 includes a video image input/output terminal, such as a high-definition multimedia interface (HDMI®) connection terminal or a serial digital interface (SDI) connection terminal. When the communication unit 54 is connected to the external device for communication with a wired cable, the communication unit 54 can output image data including live view image data (including, as needed, audio data) and various information through the external I/F 57. The external I/F includes a connection detecting sensor. The system control unit 50 can determine, based on the detection of the connection detecting sensor, whether a connection cable is attached to the external I/F 57. The system control unit 50 determines whether a connection for communication between the communication unit 54 and the external device is established through the external I/F 57 (determines whether a command is transmitted or received), thereby enabling determination whether the external device is connected through the connection cable. The image size in the live view image data output from the HDMI connection terminal serving as the external I/F 57 is switched in association with a setting for a moving image recording size set in the digital camera 100. Specifically, when a setting for recording a moving image of full high definition (HD) (1920 pixels×1080 pixels) is made as an image capturing setting for the digital camera 100, the image capturing unit 22 captures a live view image of full HD (1920 pixels×1080 pixels) even in an image capturing standby state (i.e., in a state where recording of a moving image on the recording medium 200 is not carried out). In this case, live view image data of full HD (1920 pixels×1080 pixels) is output from the HDMI connection terminal. When a setting for recording a 4K resolution (2160p, i.e., 4096 pixels×2160 pixels or 3840 pixels×2160 pixels), or a moving image including a number of pixels close to the 4K resolution, is made as an image capturing setting for the digital camera 100, the image capturing unit 22 captures a 4K live view image even in the image capturing standby state. In this case, 4K live view image data is output from the HDMI connection terminal. Similarly, the frame rate of the live view image data output from the HDMI connection terminal serving as the external I/F 57 is switched in association with the frame rate of moving image recording set in the digital camera 100.

A sound production unit 65 is a speaker corresponding to a sound output unit that outputs notification sound (electronic sound), such as in-focus sound or touch sound, according to various operations on the digital camera 100.

A sound collection unit 66 is a sound input unit that collects sound and inputs the collected sound to the system control unit 50 as audio data. The sound collection unit 66 can be composed of a microphone included in the digital camera 100, an external microphone (accessory microphone) connected to the digital camera 100, or the like. For example, in the case of moving image capturing, the system control unit 50 attaches the audio data input from the sound collection unit 66 as audio to the moving image data during moving image capturing and records the moving image data with audio. For example, when the system control unit 50 is connected to the external device for communication during live view image capturing, audio data (ambient sound) input from the sound collection unit 66 is output to the external device together with the live view image data. With this configuration, the external device can display and record moving images with audio during live view image capturing.

The units described throughout the present disclosure are exemplary and/or preferable modules for implementing processes described in the present disclosure. The term "unit", as used herein, may generally refer to firmware, software, hardware, or other component, such as circuitry or the like, or any combination thereof, that is used to effectuate a purpose. The modules can be hardware units (such as circuitry, firmware, a field programmable gate array, a digital signal processor, an application specific integrated circuit or the like) and/or software modules (such as a computer readable program or the like). The modules for implementing the various steps are not described exhaustively above. However, where there is a step of performing a certain process, there may be a corresponding functional module or unit (implemented by hardware and/or software) for implementing the same process. Technical solutions by all combinations of steps described and units corresponding to these steps are included in the present disclosure.

Figure 3A:
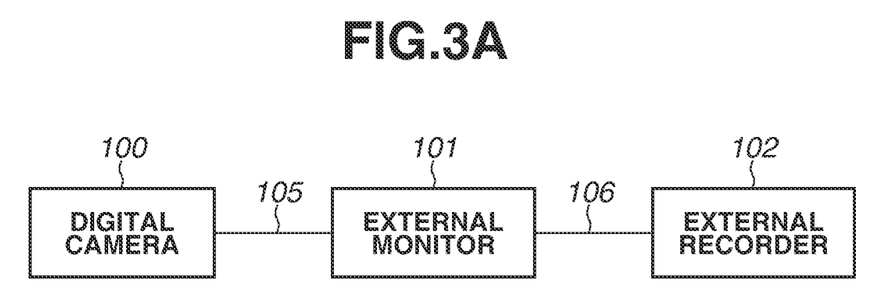
FIGS. 3A and 3B are diagrams each illustrating an example of a configuration of communication connection between the digital camera and an external device.
Figure 3B:
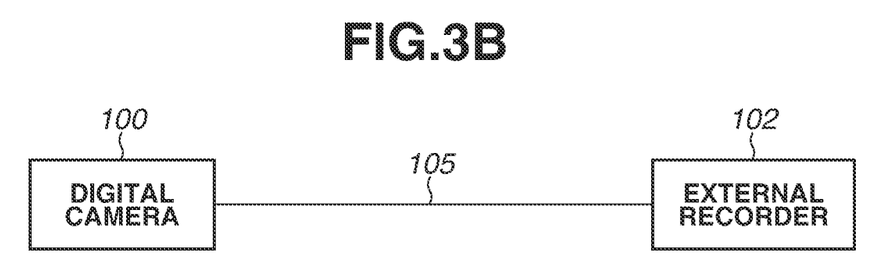

FIGS. 3A and 3B are diagrams each illustrating an example of a configuration of communication connection between the digital camera (image capturing apparatus) 100 and the external device according to an exemplary embodiment of the present disclosure.

As illustrated in FIG. 3A, the digital camera 100 can communicate with, for example, an external monitor 101 through a connection cable 105. The external monitor 101 can be connected to, for example, an external recorder 102 for communication through a connection cable 106. In the configuration of communication connection illustrated in FIG. 3A, the system control unit 50 of the digital camera 100 outputs (transmits) the image data (live view image) obtained by the image capturing unit 22 as well as the audio data obtained by the sound collection unit 66 to the external monitor 101 through communication unit 54, the external I/F 57, and the connection cable 105. The external monitor 101 outputs, to a monitor or the like, images based on the image data and audio based on the audio data which are transmitted through the connection cable (transmission path) 105. The external monitor 101 can also output the image data and audio data transmitted through the connection cable (transmission path) 105 to the external recorder 102 through the connection cable (transmission path) 106. In this case, the external recorder 102 records the live view image and audio data transmitted from the external monitor 101 on a recording medium of the external recorder 102 as a moving image with audio.

The configuration of communication connection between the digital camera 100 and the external device is not limited to the configuration illustrated in FIG. 3A. For example, the configuration of communication connection illustrated in FIG. 3B can be applied. Specifically, as illustrated in FIG. 3B, the configuration in which the digital camera 100 and the external recorder 102 are directly connected for communication through the connection cable (transmission path) 105 can be applied.

Next, a setting for outputting notification sound in the sound production unit 65 illustrated in FIG. 2 will be described.

Figure 7:
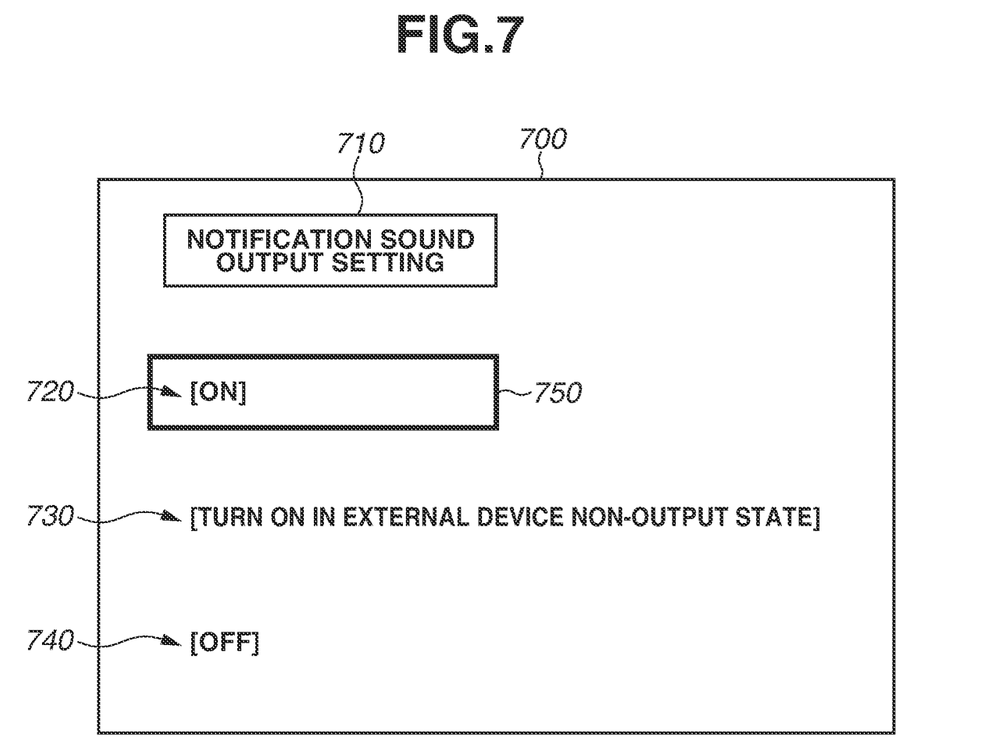
FIG. 7 is a diagram illustrating an example of a setting screen for performing a notification sound output setting in a sound production unit illustrated in FIG. 2.

FIG. 7 illustrates a setting screen 700 for setting the output of notification sound in the sound production unit 65 illustrated in FIG. 2 according to an exemplary embodiment of the present disclosure. The setting screen 700 is displayed on the display unit 28 of the digital camera 100. On the setting screen 700 illustrated in FIG. 7, a title indicating a setting content of the setting screen 700 is displayed in a display area 710. Specifically, "NOTIFICATION SOUND OUTPUT SETTING" is displayed in the display area 710.

On the setting screen 700 illustrated in FIG. 7, an icon 720 is an icon indicating a notification sound output setting "ON". In a case where the notification sound output setting "ON" indicated by the icon 720 is selected by a cursor 750, for example, the system control unit 50 performs control for enabling the output notification sound from the sound production unit 65 according to an operation on the digital camera 100.

On the setting screen 700 illustrated in FIG. 7, an icon 730 is an icon indicating a notification sound output setting "TURN ON IN EXTERNAL DEVICE NON-OUTPUT STATE". In a case where the notification sound output setting "TURN ON IN EXTERNAL DEVICE NON-OUTPUT STATE" indicated by the icon 730 is selected by the cursor 750, for example, the system control unit 50 disables the output of notification sound from the sound production unit 65 when the digital camera 100 is connected to the external monitor 101 for communication through the connection cable 105 illustrated in FIG. 3A. When the digital camera 100 is not connected to the external monitor 101 for communication through the connection cable 105 illustrated in FIG. 3A, the system control unit 50 performs control for enabling the output of notification sound from the sound production unit 65.

On the setting screen 700 illustrated in FIG. 7, an icon 740 is an icon indicating a notification sound output setting "OFF". In a case where the notification sound output setting "OFF" indicated by the icon 740 is selected by the cursor 750, for example, the system control unit 50 performs control for disabling the output of notification sound from the sound production unit 65 according to an operation on the digital camera 100.

On the setting screen 700 illustrated in FIG. 7, the cursor 750 is used to select any one of various icons 720, 730, and 740 associated with the notification sound output setting.

Next, an example of a processing procedure in a control method of the digital camera 100 according to the present exemplary embodiment will be described with reference to FIGS. 4 to 6.

Figure 4:
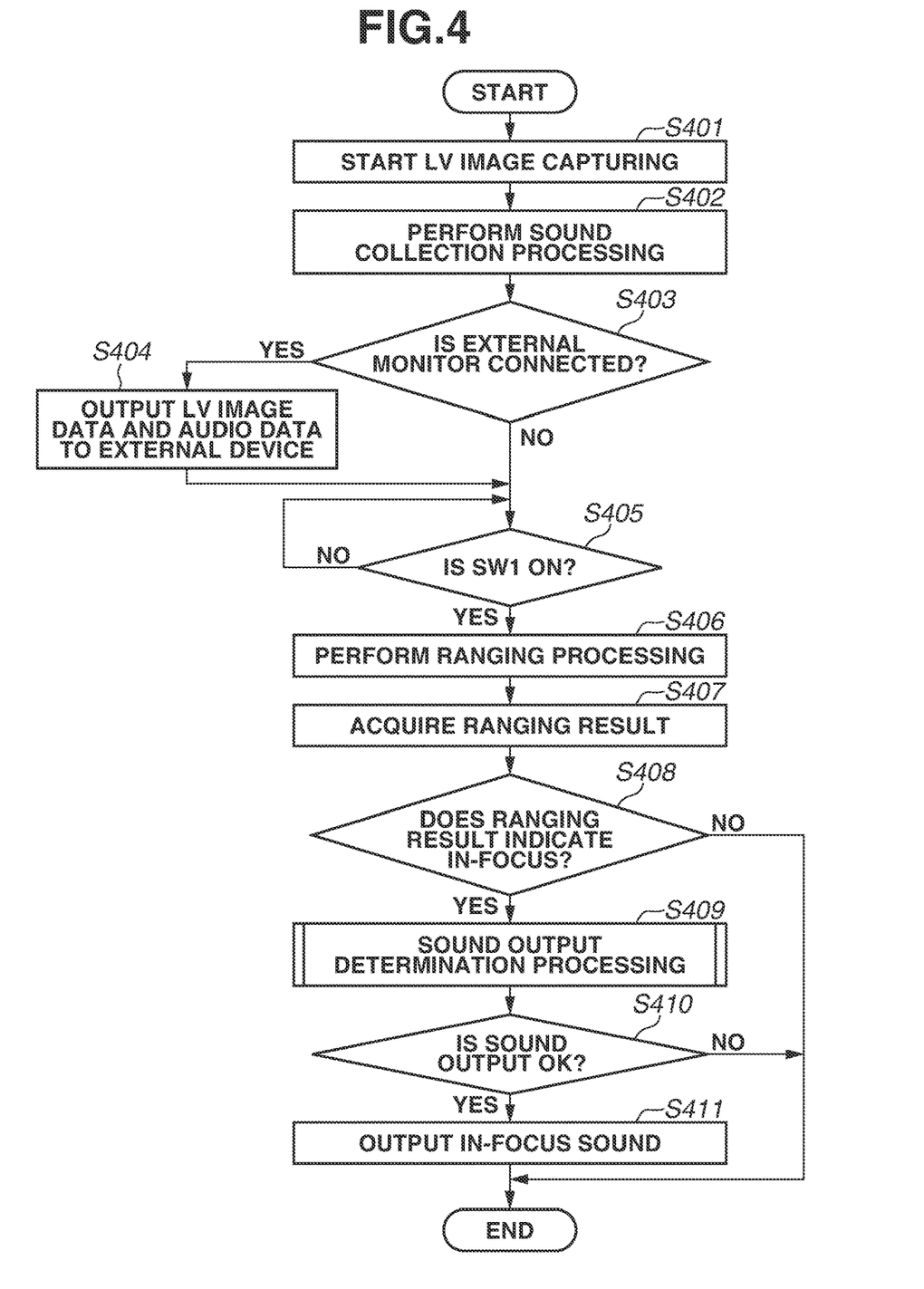
FIG. 4 is a flowchart illustrating a processing procedure in a control method during live view image capturing by the digital camera.

FIG. 4 is a flowchart illustrating an example of a processing procedure in a control method during live view image capturing of the digital camera (image capturing apparatus) 100 according to an exemplary embodiment of the present disclosure. The processing in the flowchart illustrated in FIG. 4 is started when live view image capturing is set. The processing in the flowchart illustrated in FIG. 4 is implemented in such a manner that the system control unit 50 loads programs stored in the nonvolatile memory 56 into the system memory 52 and executes the programs. In the case of starting the processing in the flowchart illustrated in FIG. 4, it is assumed that the notification sound output setting "TURN ON IN EXTERNAL DEVICE NON-OUTPUT STATE" indicated by the icon 730 is selected by the cursor 750 on the setting screen 700 illustrated in FIG. 7.

First, in step S401 of FIG. 4, the system control unit 50 starts live view (LV) image capturing. Accordingly, the system control unit 50 acquires live view image data based on live view image capturing from the image capturing unit 22.

Simultaneously with step S401, in step S402, the system control unit 50 acquires audio data obtained by the sound collection unit 66 during the live view image capturing.

Next, in step S403, the system control unit 50 determines, by detection, whether the digital camera 100 is connected to the external device (the external monitor 101 through the connection cable 105 in the example illustrated in FIG. 3A) via communication by the communication unit 54.

As a result of the determination in step S403, in a case where it is determined that the digital camera 100 is connected to the external monitor 101 as the external device via communication (YES in step S403), the processing proceeds to step S404.

In step S404, the system control unit 50 outputs the live view image data obtained in step S401 and the audio data obtained in step S402 to the external monitor 101, which is the external device, through the communication unit 54 (and also through the external I/F 57 in this example).

If the processing of step S404 is completed, or in a case where it is determined in step S403 that the digital camera 100 is not connected to the external monitor 101 as the external device via communication (NO in step S403), the processing proceeds to step S405.

In step S405, the system control unit 50 determines, by detection, whether the first shutter switch (SW1) 62 is turned on. As a result of the determination, in a case where it is determined that the first shutter switch (SW1) 62 is not turned on (NO in step S405), the system control unit 50 stands by in step S405 until the first shutter switch (SW1) 62 is turned on.

As a result of the determination in step S405, in a case where it is determined that the first shutter switch (SW1) 62 is turned on (YES in step S405), the processing proceeds to step S406.

In step S406, the system control unit 50 performs ranging processing (AF) associated with the live view image capturing.

In step S407, the system control unit 50 acquires the result of the ranging processing carried out in step S406.

In step S408, the system control unit 50 determines, by detection, whether the result of the ranging processing acquired in step S407 indicates in-focus.

As a result of the determination in step S408, in a case where it is determined that the result of the ranging processing acquired in step S407 indicates in-focus (YES in step S408), the processing proceeds to step S409.

In step S409, the system control unit 50 performs sound output determination processing for determining whether to output notification sound from the sound production unit 65.

Detailed processing of the sound output determination processing in step S409 will be described below with reference to FIG. 5.

Next, in step S410, the system control unit 50 determines whether the output of the notification sound is OK as a result of the sound output determination processing in step S409.

As a result of the determination in step S410, in a case where it is determined that the output of the notification sound is OK (YES in step S410), the processing proceeds to step S411.

In step S411, the system control unit 50 performs control for outputting in-focus sound as the notification sound from the sound production unit 65.

After completion of the processing in step S411, in a case where it is determined that the result of the ranging processing in step S408 does not indicate in-focus (NO in step S408), or in a case where it is determined in step S410 that the output of notification sound is not OK (i.e., the output of the notification sound is NG) (NO in step S410), the processing in the flowchart illustrated in FIG. 4 is terminated. In a case where it is determined in step S410 that the output of the notification sound is NG (NO in step S410), the system control unit 50 controls the sound production unit 65 so as not to output in-focus sound as the notification sound from the sound production unit 65.

In the example illustrated in FIG. 4, the sound output determination processing in step S409 is carried out immediately before in-focus sound is output in step S411. However, the timing for carrying out the sound output determination processing is not limited to this timing. For example, the sound output determination processing can be carried out at the time when step S401 or S403 is executed. In this case, for example, the result of the sound output determination processing may be temporarily held in the system memory 52 or the like, and the determination in step S410 may be made using the held result. Further, in the sound output determination processing, it is possible to employ a method of disabling the output of the notification sound by a setting on the setting screen 700 illustrated in FIG. 7 at a timing when the determination result indicating that the sound output is NG is obtained, or a method of forcibly turning "OFF" the notification sound setting on the setting screen 700 illustrated in FIG. 7 at a timing similar to that described above.

Figure 5:
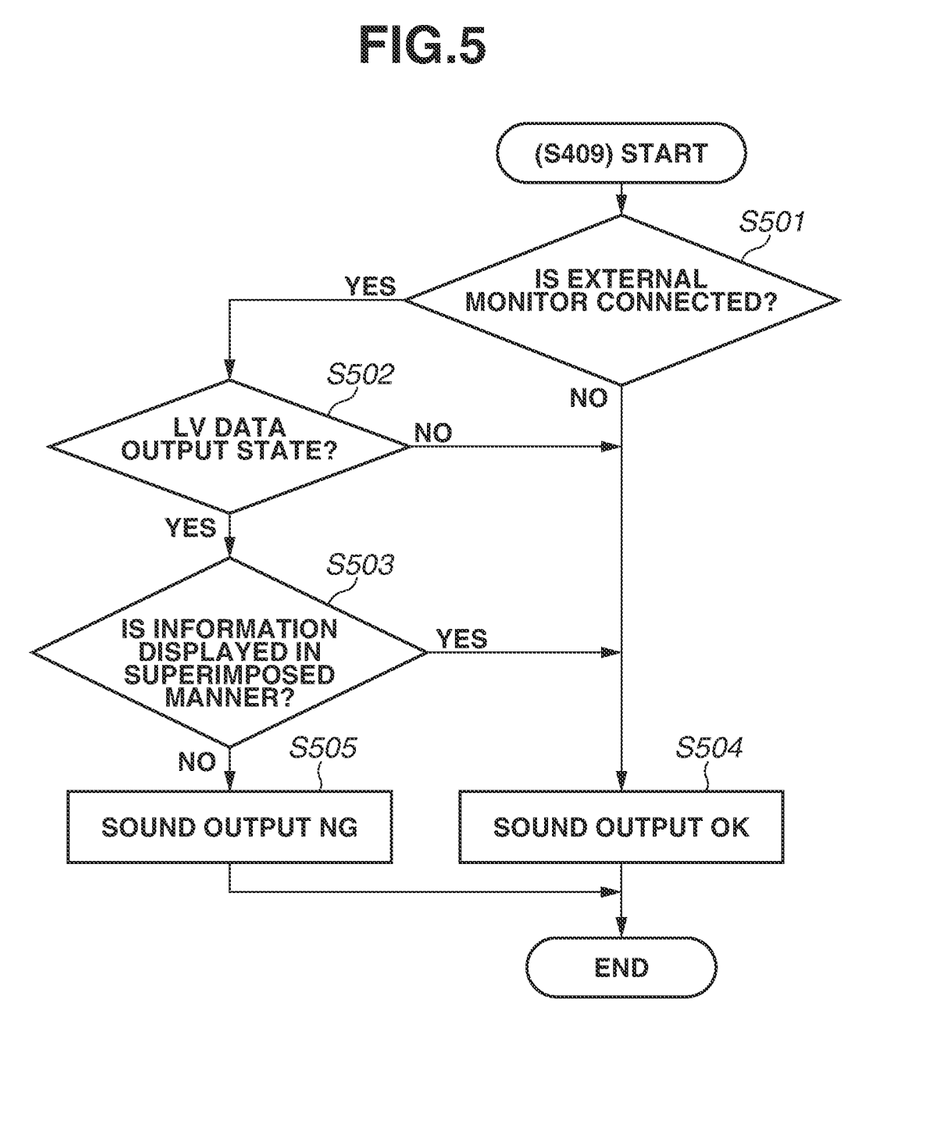
FIG. 5 is a flowchart illustrating a detailed processing procedure of sound output determination processing in step S409 illustrated in FIGS. 4 and 6.

FIG. 5 is a flowchart illustrating an example of a detailed processing procedure of the sound output determination processing in step S409 illustrated in FIG. 4.

First, in step S501 of FIG. 5, the system control unit 50 determines, by detection, whether the digital camera 100 is connected to the external monitor 101 as the external device via communication by the communication unit 54.

As a result of the determination in step S501, in a case where it is determined that the digital camera 100 is connected to the external monitor 101 as the external device via communication (YES in step S501), the processing proceeds to step S502.

In step S502, the system control unit 50 determines whether a LV data output state is set. The LV data output state is a state in which live view image data and audio data related to the live view image data are output to the external monitor 101, which is the external device, through the communication unit 54 (and also through the external I/F 57 in this example).

As a result of the determination in step S502, in a case where it is determined that the LV data output state is set (YES in step S502), the processing proceeds to step S503.

In step S503, the system control unit 50 determines whether information about the digital camera 100 is displayed in a superimposed manner on the live view image data. The digital camera 100 is capable of setting, as a display setting in the image capturing standby state or image capturing state, whether to superimpose a display of information, such as image capturing modes, various image capturing settings, and a battery remaining capacity, on the live view image. In a case where the setting for superimposing the information display is made as the display setting (YES in step S503), the processing proceeds to step S504. In a case where the setting for superimposing the information display is not made as the display setting (NO in step S503), the processing proceeds to step S505.

In a case where it is determined in step S503 that the information about the digital camera 100 is displayed in a superimposed manner on the live view image data (YES in step S503), in a case where it is determined in step S502 that the LV data output state is not set (NO in step S502), or in a case where it is determined in step S501 that the digital camera 100 is not connected to the external monitor 101 as the external device via communication (NO in step S501), the processing proceeds to step S504.

In step S504, the system control unit 50 determines that the sound output is OK or acceptable to enable the output of the notification sound from the sound production unit 65. After completion of the processing of step S504, the processing in the flowchart illustrated in FIG. 5 is terminated. As a result, the processing in step S409 illustrated in FIG. 4 is terminated.

In step S505, the system control unit 50 determines that the sound output is NG or no good so as to disable the output of the notification sound from the sound production unit 65. After completion of the processing in step S505, the processing in the flowchart illustrated in FIG. 5 is terminated. As a result, the processing in step S409 illustrated in FIG. 4 is terminated.

The reason for determining that the sound output is OK or that the sound output is NG according to the result of the determination in step S503 illustrated in FIG. 5 will now be described.

In this case, in the present exemplary embodiment, examples of the information about the digital camera 100 for which it is determined whether to display in a superimposed manner on the live view image data include information about image capturing modes, information about various image capturing settings, and information about a battery remaining capacity. When the live view image data on which the information about the digital camera 100 is superimposed and displayed is output to the external monitor 101, it is more likely that the output live view image may be monitored to check the various settings or image capturing status of the digital camera 100. Since the information about the digital camera 100 is displayed in a superimposed manner, it is impossible to record only the live view image on an output destination. Accordingly, in this state, it is less likely that the live view image may be recorded as a moving image on the external recorder 102. Therefore, in this case, it is considered that there is no problem with the output of the notification sound from the sound production unit 65, and thus in the present exemplary embodiment, it is determined that the sound output is OK in step S504 illustrated in FIG. 5. On the other hand, when the live view image data on which the information about the digital camera 100 is not superimposed and displayed is output to the external monitor 101, there is a possibility (it is more likely) that the live view image data may be recorded as a moving image on the external recorder 102. Accordingly, in this case, if the notification sound is output from the sound production unit 65, audio data related to the notification sound is recorded together with the moving image data recorded on the external recorder 102, which makes it difficult to obtain a moving image with natural sound of a subject recorded thereon. For this reason, in the present exemplary embodiment, it is determined that the sound output is NG in step S505 illustrated in FIG. 5 in this case.

The examples described herein are examples of a determination as to whether recording by the external recorder 102 is assumed in steps S502 and S503. The state in which recording by the external recorder 102 is assumed in the present exemplary embodiment is a state in which the live view image data on which the information about the digital camera 100, such as setting values, a shutter speed, an aperture value, and an exposure control value such as an International Organization of Standardization (ISO) value of the digital camera 100, is not displayed is output to the external device through the connection cable 105. As the state in which recording by the external recorder 102 is assumed, various states can be considered in addition to the above-described state. In the present disclosure, the type of the state is not particularly limited and various types can be applied.

Figure 6:
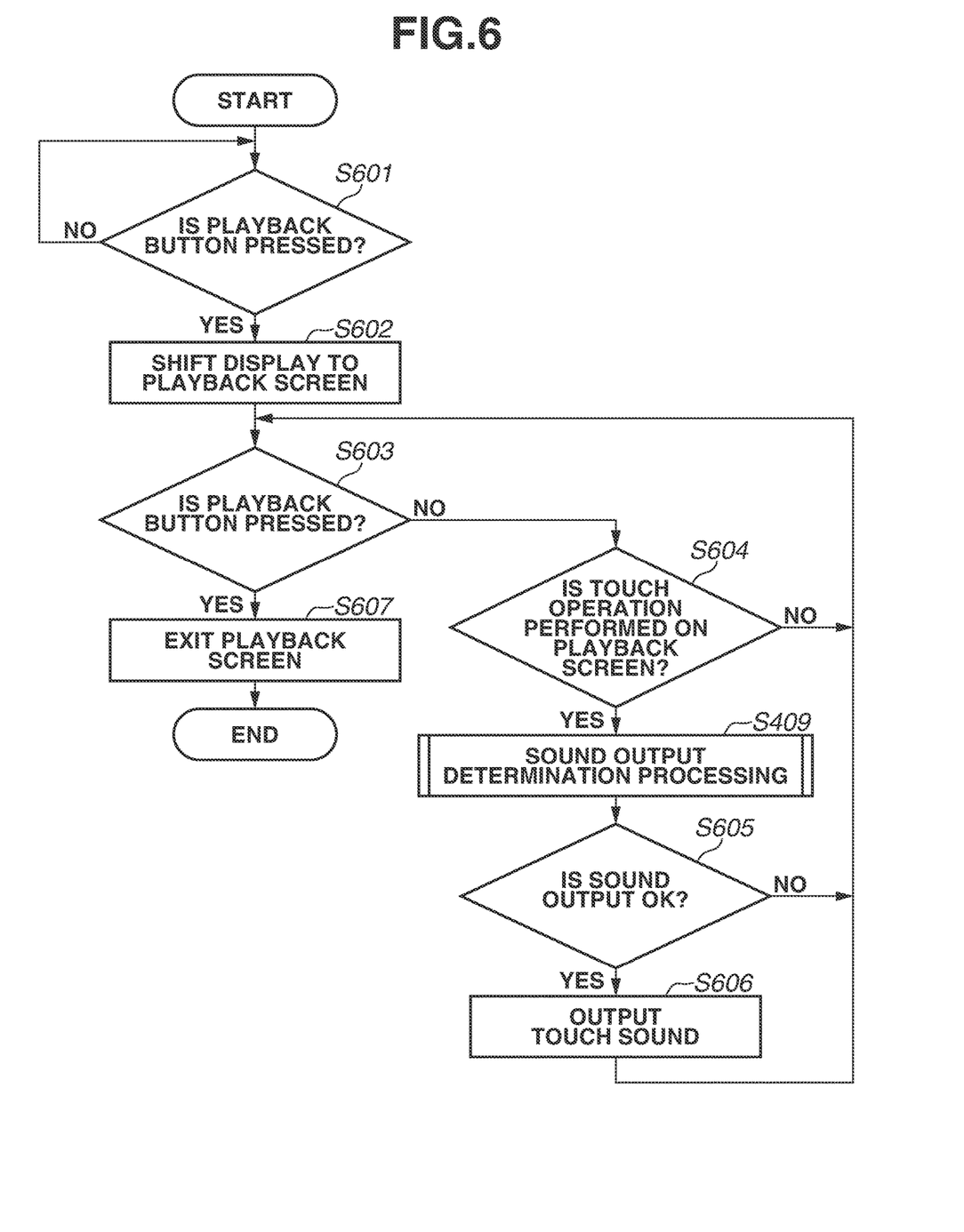
FIG. 6 is a flowchart illustrating a processing procedure in a control method during image playback by the digital camera according to the present exemplary embodiment.

FIG. 6 is a flowchart illustrating an example of a processing procedure in a control method during image playback of the digital camera (image capturing apparatus) 100 according to an exemplary embodiment of the present disclosure. The processing in the flowchart illustrated in FIG. 6 is implemented in such a manner that the system control unit 50 loads programs stored in the nonvolatile memory 56 into the system memory 52 and executes the programs. In FIG. 6, processing steps similar to the processing steps illustrated in FIG. 4 are denoted by the same step numbers.

First, in step S601 of FIG. 6, the system control unit 50 determines, by detection, whether the playback button 78 included in the operation unit 70 is pressed. As a result of the determination, in a case where it is determined that the playback button 78 is not pressed (NO in step S601), the system control unit 50 stands by in step S601 until the playback button 78 is pressed.

As a result of the determination in step S601, in a case where it is determined that the playback button 78 is pressed (YES in step S601), the processing proceeds to step S602.

In step S602, the system control unit 50 performs processing for shifting the display of the display unit 28 to a playback screen.

In step S603, the system control unit 50 determines, by detection, whether the playback button 78 is pressed again.

As a result of the determination in step S603, in a case where it is determined that the playback button 78 is not pressed (NO in step S603), the processing proceeds to step S604.

In step S604, the system control unit 50 determines, by detection, whether a touch operation is performed on the playback screen displayed on the display unit 28 through the operation unit 70.

As a result of the determination in step S604, in a case where the touch operation is performed on the playback screen displayed on the display unit 28 (YES in step S604), the processing proceeds to step S409.

In step S409, the system control unit 50 performs the processing of each step illustrated in FIG. 5. In the case illustrated in FIG. 6, playback image data for which a playback instruction is made is output to the external monitor 101 as the external device, instead of outputting the live view image data described above. Accordingly, since the result of the determination in step S502 illustrated in FIG. 5 indicates "NO" (NO in step S502), it is determined that the sound output is OK in step S504 illustrated in FIG. 5.

Next, in step S605, the system control unit 50 determines whether the output of the notification sound is OK as a result of the sound output determination processing in step S409.

As a result of the determination in step S605, in a case where it is determined that the output of the notification sound is OK (YES in step S605), the processing proceeds to step S606.

In step S606, the system control unit 50 performs control for outputting touch sound as the notification sound from the sound production unit 65.

After completion of the processing in step S06, in a case where it is determined in step S605 that the output of the notification sound is not OK (NO in step S605), or in a case where it is determined in step S604 that the touch operation is not performed on the playback screen (NO in step S604), the processing returns to step S603.

As a result of the determination in step S603, in a case where the playback button 78 is pressed (YES in step S603), the processing proceeds to step S607.

In step S607, the system control unit 50 exits the playback screen displayed on the display unit 28 and terminates the processing in the flowchart illustrated in FIG. 6.

In the digital camera 100 according to an exemplary embodiment of the present disclosure described above, during live view image capturing, the system control unit 50 controls the sound production unit 65 so as not to output the notification sound (step S505 illustrated in FIG. 5 and step S410 illustrated in FIG. 4) in a case where the live view image data obtained by the image capturing unit 22 and the audio data obtained by the sound collection unit 66 are output to the external monitor 101 connected via communication through the communication unit 54 (and also through the external I/F 57 in this example) (step S404 illustrated in FIG. 4). As a method for controlling (restricting) the notification sound so as not to be output, a method of stopping power supply to the sound production unit 65, a method of stopping audio input to the sound production unit 65, a method of stopping reading of audio data on the notification sound, and the like can be employed in addition to the method of controlling the sound production unit 65.

According to this configuration, it is possible to avoid such a failure that the notification sound output according to an operation on the digital camera 100 is mixed in recording data relating to live view image capturing to be recorded on the external recorder 102, and the recording data is recorded in the external recorder 102. Consequently, it is possible for the external device to acquire an appropriate moving image with audio to which ambient sound (only the sound output from a subject) is added. The above-described control processing is carried out regardless of whether the operation state is the moving image recording state (state in which a moving image is recorded on the recording medium 200 or the recording medium built in the digital camera 100) or the recording standby state of the digital camera 100. Specifically, even in the standby state in which moving image recording is not performed by the digital camera 100, a live view image and audio are output to an external device, and if the condition that the output of the notification sound is NG in the above-described processing is satisfied, control is performed so as not to output the notification sound.

Furthermore, in the digital camera 100 according to an exemplary embodiment of the present disclosure, when the playback image data for which a playback instruction is made is output to the external monitor 101 connected via communication through the communication unit 54 (and also through the external I/F 57 in this example), the system control unit 50 does not perform control for preventing the notification sound from being output from the sound production unit 65 (i.e., performs control for outputting the notification sound from the sound production unit 65) (steps S502 and S504 illustrated in FIG. 5 and steps S605 and S606 illustrated in FIG. 6). According to this configuration, when playback screen data is output to the external monitor 101, it is considered that recording of the playback screen data on the external recorder 102 is not assumed, and thus it is preferred to output the notification sound according to an operation.

In the present exemplary embodiment, the system control unit 50 can also make a setting as to whether the notification sound can be output from the sound production unit 65, based on information input on the setting screen 700 illustrated in FIG. 7. In the present exemplary embodiment, when the system control unit 50 controls the sound production unit 65 so as not to output the notification sound (step S505 illustrated in FIG. 5 and step S410 illustrated in FIG. 4), the control processing can be carried out regardless of whether the external recorder 102, which is the external device, is in the recording state.

Various control processes illustrated in FIGS. 4 to 6 described above assuming that the control processes are performed by the system control unit 50 can be implemented by a piece of hardware, or the control processing of the entire apparatus can be performed by sharing the control processes among a plurality of pieces of hardware.

While the present disclosure has been described in detail above based on preferred exemplary embodiments, the present disclosure is not limited to specific exemplary embodiments described above. Various modes within the scope of the disclosure are also included in the present disclosure. Further, the exemplary embodiments described above are merely exemplary embodiments of the present disclosure and the exemplary embodiments can be combined as appropriate.

While the exemplary embodiments described above illustrate a case where the present disclosure is applied to a digital camera, the present disclosure is not limited to this example. Any image capturing apparatus can be applied as long as the image capturing apparatus is capable of outputting a live view image with audio. Specifically, the present disclosure can be applied to a camera-equipped personal computer, a camera-equipped portable digital assistant (PDA), a camera-equipped mobile phone terminal (including a smartphone), a music player, a game console, an electronic book reader, a tablet terminal, a projection apparatus, in-vehicle devices, and the like.

The exemplary embodiments of the present disclosure described above are merely specific examples for carrying out the present disclosure, and the technical scope of the present disclosure should not be restrictively interpreted based on the exemplary embodiments. That is, the present disclosure can be carried out in various forms without departing from the technical ideal of the present disclosure or main features of the present disclosure.

According to the present exemplary embodiment, it is possible for an external device to acquire appropriate output data when data obtained by an image capturing apparatus is output to the external device.

Other Embodiments

Embodiment(s) of the present disclosure can also be realized by a computerized configuration(s) of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computerized configuration(s) of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computerized configuration(s) may comprise one or more processors, one or more memories (e.g., central processing unit (CPU), micro processing unit (MPU)), and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2017-132938, filed Jul. 6, 2017, which is hereby incorporated by reference herein in its entirety.

What is claimed is:

1. An image capturing apparatus comprising:
an image capturing unit;
a sound input unit configured to input sound;
a sound production unit configured to produce notification sound;
a connection unit configured to connect to an external device;
an output unit configured to output the sound input from the sound input unit and a live view image captured by the image capturing unit to the external device via the connection unit; and
a memory and at least one processor which function as a control unit configured to control the sound production unit so as not to produce the notification sound when the sound and the live view image are output by the output unit.

2. The image capturing apparatus according to claim 1, wherein depending on whether the external device is connected to the image capturing apparatus via the connection unit, the control unit controls the sound production unit so as not to produce the notification sound when the sound and the live view image are output by the output unit.

3. The image capturing apparatus according to claim 1, further comprising
a connection detecting unit configured to detect whether the external device is connected to the image capturing apparatus via the connection unit, wherein in a case where the connection detecting unit detects that the external device is connected to the image capturing apparatus, the control unit controls the sound production unit so as not to produce the notification sound when the sound and the live view image are output by the output unit.

4. The image capturing apparatus according to claim 1, further comprising
a first setting unit configured to set whether information about the image capturing apparatus is displayed on the live view image in a superimposed manner,
wherein, in a case where the first setting unit sets not to display the information about the image capturing apparatus on the live view image in a superimposed manner, the control unit controls the sound production unit so as not to produce the notification sound when the sound and the live view image are output by the output unit, and in a case where the first setting unit sets to display the information about the image capturing apparatus on the live view image in a superimposed manner, the production of the notification sound by the sound production unit is not restricted even when the sound and the live view image are output by the output unit.

5. The image capturing apparatus according to claim 1, further comprising
a recording unit configured to record a moving image captured by the image capturing unit on a recording medium attached to the image capturing apparatus or a recording medium built in the image capturing apparatus,
wherein the control unit controls the sound production unit so as not to produce the notification sound when the sound and the live view image are output by the output unit, regardless of whether recording is performed by the recording unit.

6. The image capturing apparatus according to claim 1, wherein the control unit controls the sound production unit so as not to produce the notification sound when the sound and the live view image are output by the output unit, regardless of whether the external device is in a recording state.

7. The image capturing apparatus according to claim 1,
wherein the output unit is capable of outputting a playback image to the external device via the connection unit, and
wherein in a case where the playback image is output by the output unit, the control unit performs control in such a manner that the production of the notification sound by the sound production unit is not restricted when the sound and the live view image are output by the output unit.

8. The image capturing apparatus according to claim 1, further comprising
a second setting unit configured to set a permission/prohibition of output of the notification sound,
wherein the control unit controls, based on the setting of the second setting unit, the sound production unit so as not to produce the notification sound when the sound and the live view image are output by the output unit.

9. The image capturing apparatus according to claim 8, wherein settings settable by the second setting unit include a first setting in which the notification sound is output regardless of whether the sound as well as the live view image is output by the output unit, a second setting in which the notification sound is not output when the sound as well as the live view image is output, and a third setting in which the notification sound is not output regardless of whether the sound as well as the live view image is output.

10. The image capturing apparatus according to claim 1, wherein the connection unit is a high-definition multimedia interface (HDMI) connection terminal.

11. The image capturing apparatus according to claim 1, wherein the connection unit is wirelessly connected to the external device.

12. The image capturing apparatus according to claim 1, wherein the connection unit is a serial digital interface (SDI) connection terminal.

13. The image capturing apparatus according to claim 1, wherein the connection unit is a connection terminal of a cable.

14. A control method of an image capturing apparatus including an image capturing unit, the control method comprising:
inputting sound;
producing notification sound;
connecting to an external device;
outputting, to the external device, the input sound and a live view image captured by the image capturing unit; and
performing control so as not to produce the notification sound when the sound and the live view image are output.

15. A computer-readable non-transitory storage medium storing a program for causing a computer to execute a control method of an image capturing apparatus including an image capturing unit, the control method comprising:
inputting sound;
producing notification sound;
connecting to an external device;
outputting, to the external device, the input sound and a live view image captured by the image capturing unit; and
performing control so as not to produce the notification sound when the sound and the live view image are output.

* * * * *